Figure 2:
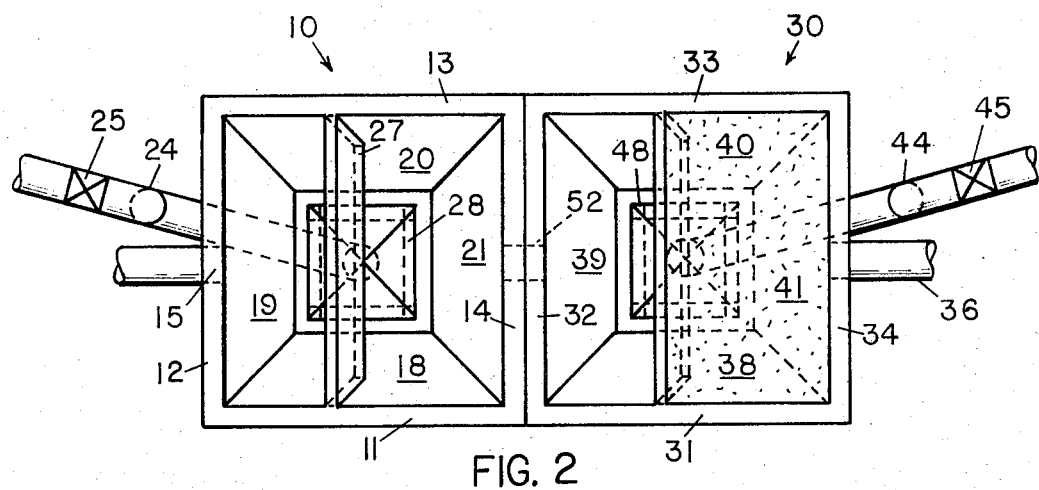

United States Patent [19]
Stevenson

[11] 3,837,494
[45] Sept. 24, 1974

[54] SEWAGE TREATMENT APPARATUS

[76] Inventor: Bernard H. Stevenson, 1736 Linhart Ave., Fort Myers, Fla. 33901

[22] Filed: Aug. 16, 1972

[21] Appl. No.: 281,125

[52] U.S. Cl.............. 210/259, 210/305, 210/311, 210/533, 210/540
[51] Int. Cl...................... B01d 21/10, B01d 29/00
[58] Field of Search .......... 210/259, 260, 305, 306, 210/311, 313, 533, 534, 540

[56] References Cited
UNITED STATES PATENTS

| | | | |
|---|---|---|---|
| 827,400 | 7/1906 | Sheuerman et al. | 210/311 X |
| 952,620 | 3/1910 | Keyes | 210/306 |
| 2,146,542 | 2/1939 | Hawley | 210/260 X |
| 2,359,386 | 10/1944 | Reinsch | 210/306 |

Primary Examiner—John Adee
Attorney, Agent, or Firm—Hood & Coffey

[57] ABSTRACT

For use in a sewage treatment system, a settling tank and a filtering tank, each such tank having near its upper end an inlet and, at a slightly lower level, an opposite outlet, the outlet of the settling tank communicating with the inlet of the filtering tank, and each tank having in its nether region a section of downwardly progressively reducing cross section terminating in a floor provided with a central sludge withdrawal port. Each tank is provided with a downwardly extending baffle dividing its interior into two legs of unequal section communicating only near the tank floor; and the filtering tank having an upflow filter near the upper end of its outlet leg. A downwardly-flaring guard is concentrically suspended above each sludge withdrawal port and a lower section of each baffle is inclined to terminate above the apex of its associated guard substantially in the median vertical plane of the tank.

3 Claims, 2 Drawing Figures

SEWAGE TREATMENT APPARATUS

The present invention relates to the structure of settling tanks and filtering tanks for use in sewage treatment systems and the primary object of the invention is to provide improved structure of such character as to perform more effectively the intended functions of such tanks in such systems.

A settling tank in such a system conventionally has vertical walls upstanding from a flat bottom, is of uniform cross sectional area from top to bottom, has an inlet near its top for receiving sludge-bearing liquid, has an opposite outlet at a level slightly below that of the inlet and is without baffling means between the inlet and outlet. Liquid stands in the tank for a considerable period, whereby the sludge largely settles out of suspension. Sludge is removed from the nether regions of the tank by pumping through a pipe which depends through the open top of the tank to a point near the center of the tank floor. As a consequence, there is a tendency for sludge to stagnate in the perimetral regions of the floor, thus interfering with the intended functions of the tank.

According to the present invention, the nether region of the tank is progressively reduced in cross sectional area, a sludge-withdrawal port is centrally formed in the tank floor and means is provided to encourage a whirlpool action of the thick suspension at the bottom of the tank as it is withdrawn through that port to sweep the perimetral region of the floor, thus preventing perimetral accumulation of stagnant sludge.

Additionally, baffle means is provided to prevent direct flow of any liquid across the upper regions of the tank from the inlet to the outlet, thus assuring retention of all of the liquid flowing through the tank for a significant time period.

The filter tank according to the present invention is similar in construction to the settling tank above described, for the same reasons; and additionally, an upflow filter is disposed in that leg of the tank which is remote from the inlet.

Still further objects of the invention will appear as the description proceeds.

To the accomplishment of the above and related objects, this invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
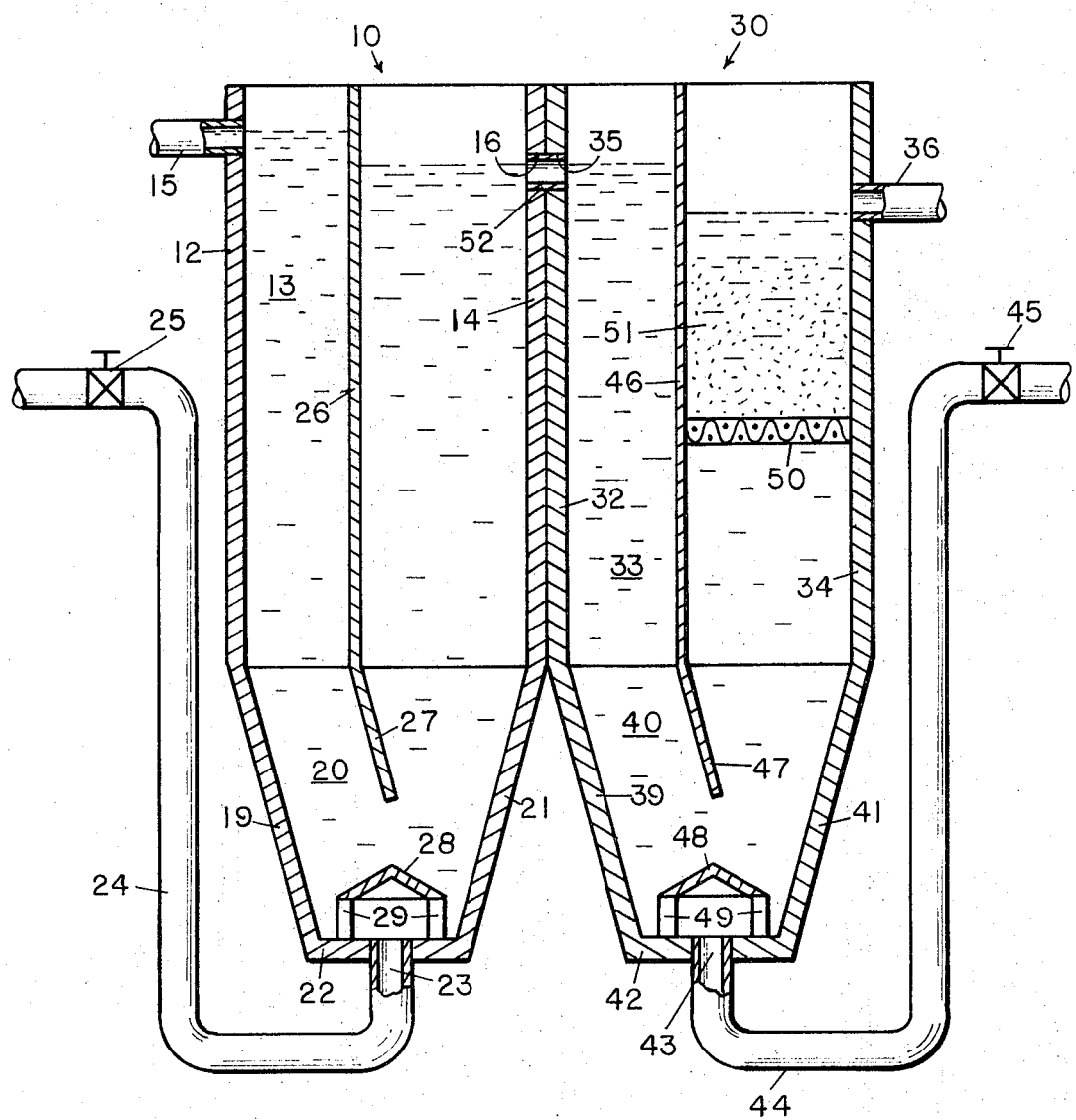

In the drawings:

FIG. 1 is a vertical section, more or less diagrammatic, through a settling tank and a filter tank constructed in accordance with the present invention and arranged in direct juxtaposition for flow from the settling tank to and through the filtering tank; and FIG. 2 is a top plan view of the structure illustrated in FIG. 1.

Referring more particularly to the drawings, the reference numeral 10 designates generally a settling tank constructed in accordance with the present invention. As shown, the tank 10 is equilaterally rectangular in cross section, comprising four walls 11, 12, 13 and 14. An inlet 15, which may lead from a conventional aeration chamber, enters the wall 12 near the upper end thereof; and an outlet 16 is formed, at a somewhat lower level, in the opposite wall 14.

In their lower regions, the walls 1, 2, 3, and 4, are formed to provide converging sections 18, 19, 20 and 21 to meet the tank floor 22 whose area is significantly smaller than the cross sectional area of the upper portion of the tank.

Centrally disposed in the floor 22 is a sludge withdrawal port 23 with which is connected a conduit 24 leading, past a control valve 25, to a desired point such as, for instance, the aeration chamber (not shown) or a sludge reservoir.

A baffle 26 is disposed within the tank to span the walls 11 and 13. Preferably, the main body of the baffle 26 is parallel with the wall 12 and is located about one-third of the distance from the wall 12 to the wall 14. The lower portion 27 of the baffle is inclined, substantially in parallelism with the wall section 19, toward the median plane between the walls 12 and 14 and terminates substantially in that median plane.

A downwardly-flaring guard 28, supported above the floor 22 by a plurality of legs 29 mounted, for instance, at the corners of the bottom edge of the guard, is suspended concentrically above the port 23 with its apex disposed substantially in that median plane and its perimeter substantially equally spaced from the wall sections 18, 19, 20 and 21.

As sludge-bearing liquid enters the tank 10 through the inlet 15, of course its only path to the outlet 16 will be downwardly between the wall 12 and the baffle 26, beneath the distal end of the baffle section 27 and thence upwardly between the baffle 26 and the wall 14 to the outlet 16. The rate of flow is so controlled that each modicum of the liquid will thus be held in the tank long enough for a substantial portion of the sludge to settle out of suspension, so that relatively clear liquid will be discharged through the outlet 16.

Sludge will accumulate in the nether regions of the tank; and periodically the valve 25 will be opened to withdraw accumulated sludge through the port 23. As the thick accumulation begins so to flow, the perimetral surfaces of the guard 28 will deflect the stream outwardly to sweep the corners between the floor and the inclined wall sections; and at the same time the well known whirlpool effect (which is clockwise in the northern hemisphere and counterclockwise in the southern hemisphere) will set up its sweeping action. As a consequence, any tendency of the accumulated sludge to "cake" or harden in those corners, and thus to stagnate, will be overcome and the nether regions of the tank will be effectively cleared of accumulated sludge.

Two or more of the tanks 10 may, of course, be used in series if desired.

The reference numeral 30 indicates generally a filtering tank which may or may not be used in series with one or more tanks 10. As shown, the tank 30 is generally similar to the tank 10, being rectangular in horizontal section and comprising the walls 31, 32, 33 and 34. In the illustrated embodiment of the invention, the wall 32 is commensurate with the wall 14 of the tank 10 and is arranged in abutting relationship therewith, the inlet 35 through the wall 32 registering with the outlet 16 through the wall 14. Conduit means 52 is preferably arranged in the ports 16 and 35 as shown.

The wall 34 is provided with an outlet 36 at a level slightly below that of the inlet 35.

The lower sections 38, 39, 40 and 41 of the said walls are inclined downwardly and inwardly to merge with a floor 42 having a central sludge withdrawal port 43. Conduit means 44, dominated by a valve 45, leads from the port 43 to any desired point such as, for instance, the aeration tank or a sludge reservoir.

A baffle 46 spans the walls 31 and 33 and extends downwardly from a level above the inlet 35, in substantial parallelism with the wall 32 and nearer to that wall than to the wall 34. The lower section 47 of the baffle 46 is inclined downwardly and toward the median plane between the walls 32 and 34, terminating substantially in that plane.

A downwardly-flaring guard 48 is supported above the port 43 by legs 49, the apex of said guard being disposed substantially in said median plane.

The operation of the tank 30 is similar to that of the tank 10. Incompletely clarified liquid will enter the inlet 35 and flow downwardly to pass the bottom of the baffle 46, whereafter it will flow upwardly to the outlet 36. The flow rate is slow and sludge not completely removed in the tank 10 will settle toward the bottom of the tank 30. When the valve 45 is opened, liquid laden with that settled sludge will flow through the port 43 to produce the whirlpool sweeping action described in connection with the tank 10.

In the up-flow leg of the tank 30, I provide a foraminous partition 50 upon which is supported a filter bed of sand or other suitable filtering medium; and the last traces of unsettled sludge will be removed from the stream by the filtering medium 51.

Laboratory tests have established the fact that the functional effects above described will result from the described apparatus and that improved clarification and purification will be achieved in a much shorter time than is required for even less satisfactory clarification in the apparatus of the prior art as described in the opening paragraphs of this specification.

I claim as my invention:

1. In a sewage treatment system, a settling tank whose right transaxial section is an equilateral polygon, the nether region only of said tank being of descending progressively reducing equilateral cross-sectional area, said tank being provided with an inlet near the upper end of a side wall positioned and adapted to receive a sludge suspension and being provided with an outlet near the upper end of an opposite side wall but at a level lower than said inlet, a central sludge discharge port in the floor of said tank, a downwardly-flaring guard of equilateral polygonal section suspended in said tank above said discharge port and substantially concentric therewith, and a baffle in said tank extending downwardly from a level at least as high as said inlet, the major length of said baffle being nearer to said first-named side wall than to said opposite side wall, and the nether region of said baffle inclining toward said discharge port and terminating above the apex of said guard and substantially in registry with said apex.

2. In combination, the settling tank of claim 1, a filtering tank whose right transaxial section is an equilateral polygon, the nether region only of said filtering tank being of descending progressively reducing equilateral cross-sectional area, said filter tank being provided with an inlet near the upper end of a side wall and communicating with the outlet of said settling tank, and said filtering tank being provided with an outlet near the upper end of an opposite side wall but at a level lower than said filter tank inlet, a central sludge discharge port in the floor of said filter tank, a downwardly-flaring guard of equilateral polygonal section suspended above said discharge port and substantially concentric therewith, a baffle in said filter tank extending downwardly from a level at least as high as said filter tank inlet, the major length of said baffle being nearer to said first-named filter tank side wall than to said opposite side wall thereof and the nether region of said baffle inclining toward said filter tank discharge port and terminating above the apex of said guard and substantially in registry with said apex to divide said filter tank into an inlet leg and an outlet leg communicating only beneath said baffle, and an up-flow filter filling said outlet leg in a region between the lower end of said baffle and said filter tank outlet.

3. In a sewage treatment system, a filtering tank whose right transaxial section is an equilateral polygon, the nether region only of said filtering tank being of descending progressively reducing equilateral cross-sectional area, said filter tank being provided with an inlet near the upper end of a side wall and with an outlet near the upper end of an opposite side wall but at a level lower than said filter tank inlet, a central sludge discharge port in the floor of said filter tank, a downwardly-flaring guard of equilateral polygonal section suspended above said discharge port and substantially concentric therewith, a baffle in said filter tank extending downwardly from a level at least as high as said filter tank inlet, the major length of said baffle being nearer to said first-named filter tank side wall than to said opposite side wall thereof and the nether region of said baffle inclining toward said filter tank discharge port and terminating above the apex of said guard and substantially in registry with said apex to divide said filter tank into an inlet leg and an outlet leg communicating only beneath said baffle, and an up-flow filter filling said outlet leg in a region between the lower end of said baffle and said filter tank outlet.

* * * * *